United States Patent [19]

Farr

[11] 4,199,941
[45] Apr. 29, 1980

[54] HYDRAULIC SYSTEMS

[75] Inventor: Glyn P. R. Farr, Leek Wooton, England

[73] Assignee: Girling Limited, Birmingham, England

[21] Appl. No.: 937,706

[22] Filed: Aug. 29, 1978

[30] Foreign Application Priority Data

Sep. 1, 1977 [GB] United Kingdom ............... 36467/77

[51] Int. Cl.² .................................................. F15B 1/02
[52] U.S. Cl. ......................................... 60/413; 60/418
[58] Field of Search .......................... 60/413, 418, 468; 137/115

[56] References Cited

U.S. PATENT DOCUMENTS

| 2,264,375 | 12/1941 | Hill et al. | 60/418 X |
|---|---|---|---|
| 2,674,092 | 4/1954 | Gardiner | 60/418 |
| 3,563,033 | 2/1971 | Brewer | 60/418 |

Primary Examiner—Edgar W. Geoghegan
Attorney, Agent, or Firm—Scrivener, Parker, Scrivener and Clarke

[57] ABSTRACT

In an hydraulic system an unloader valve is located in a line between a pump and an hydraulic accumulator. The unloader valve is operative to prevent the accumulator from being overcharged and to allow the pump to re-charge the accumulator should the pressure stored therein fall below a desired minimum value. The unloader valve incorporates a control valve comprising a spool, and a pressure responsive slave which is operated by fluid pressure under the control of the control valve. Two springs bias the spool into a first position in which pump pressure can be supplied to the accumulator, and the second spring is inoperative when the spool is moved into a second position in which fluid pressure from the accumulator can act on the sleeve to reduce the pump pressure to that of the tank for the pump.

8 Claims, 3 Drawing Figures

HYDRAULIC SYSTEMS

SPECIFIC DESCRIPTION

This invention relates to improvements in hydraulic systems of the kind in which an hydraulic accumulator is charged with hydraulic fluid under pressure by means of an hydraulic pump which draws hydraulic fluid from a tank, and an unloader valve disposed in a supply line between the pump and the accumulator is operative to prevent the accumulator from being overcharged and to allow the pump to re-charge the accumulator should the pressure stored therein fall below a desired minimum value. Our invention is particularly concerned with improvements in unloader valves for hydraulic systems of the kind set forth.

In an hydraulic system of the kind set forth the unloader valve provides the accumulator with a working range in which the pump can idle, or be disabled, to prevent the hydraulic fluid from overheating. Ideally, when the accumulator pressure is at a maximum, the pump should be inoperative so that there will be no circulation of fluid. As this would mean zero pump torque when idling, such an ideal is not always practical and it is simpler to allow the pump to circulate fluid at zero pressure.

Known unloader valves incorporate in parallel a cut-out valve, suitably a first control piston which is loaded by a first spring, and a diverter valve, suitably a second control piston which is loaded by a second spring, with both valves subjected to pressure in the accumulator, in which the cut-out valve determines a "cut-out" point at which it closes to prevent the accumulator from being overcharged when a force generated by accumulator pressure exceeds the force in the first spring and, after the cut-out valve closes, the diverter valve moves in opposition to the second spring into a diverting position in which pump pressure is diverted, suitably to the tank, until the pressure in the accumulator has dropped to a value at a "cut-in" point at which the second spring moves the diverter into a position to re-apply pump pressure to the accumulator until the cut-out point is again reached.

According to our invention in an hydraulic system of the kind set forth the unloader valve incorporates a control valve, and a pressure responsive slave which is operated by fluid pressure under the control of the control valve, the control valve comprising a valve member which is movable between a first position in which the accumulator is isolated from the slave so that pump pressure is supplied to the accumulator, and a second position in which fluid pressure from the accumulator can act on the slave to render the slave operative to reduce the pump pressure to that of the tank, and spring means for biassing the valve member towards the first position, the valve member being subjected to a control pressure dependent upon the pressure in the accumulator and in response to which the valve member can move at a cut-out point from the first position into the second position against the bias in the spring means, the bias in the spring means determining a cut-in point at an accumulator pressure less than the pressure in the accumulator at a cut-out point at which the valve member can move from the second position into the first position.

Preferably first and second springs bias the valve member towards the first position. The first spring is operative at all times and the second spring is inoperative at least when the valve member is in the second position, the bias in the first spring alone determining the cut-in point.

Conveniently the control valve and the slave are arranged co-axially and work in a single bore, and the second spring may also comprise a return spring for the slave.

The construction is therefore relatively simple and compact and the working parts can be arranged co-axially to provide efficient operation of the unloader valve.

Preferably a restriction is located in a connection between the control valve and the slave so that the signal to unload or reduce the pump pressure to atmosphere at the cut-out point is given prior to a decrease in pump pressure, due to time lag before the pressure necessary to operate the slave can be built-up. Similarly the restrictor provides a delay between the cut-in point to re-charge the accumulator and the point at which the slave is operative to permit the pump to re-charge the accumulator. This makes the unloader valve particularly suitable for use with a pump having a ripple free output.

The slave may comprise a slave member for connecting the pump to the tank when the cut-out pressure is attained. This provides circulation of fluid through the unloader valve at a low pressure during the period that the pressure in the accumulator drops from the cut-out point to the cut-in point.

Alternatively, the slave may comprise a piston which acts to disable the pump, for example by disconnecting a drive to the pump, when the cut-off pressure is attained. Thus, no fluid is circulated by the pump during the period that the pressure in the accumulator drops from the cut-out to the cut-in point. The slave piston may, for example, act on a lever for controlling the connection between the drive and the pump, or control operative engagement between the gears or a clutch through which the pump is driven.

Conveniently the valve member comprises a valve spool which works in a bore in the housing and is acted on at one end by the first spring, and the valve spool includes axially spaced lands which control communication between the pump, the slave and the accumulator and a one-way valve is located in the housing between the pump and the accumulator to permit flow from the pump into the accumulator.

The slave may comprise a sleeve slidably mounted on the spool and working in the bore with the second spring acting on one end of the sleeve at all times and on the valve spool at all times when the slave is inoperative.

Alternatively the slave may comprise a piston which works in the bore and acts on the spool through an intermediate member which is biassed into engagement with the slave by the second spring at least when the fluid pressure from the accumulator acts on the slave.

The control pressure acting on the valve member may comprise the accumulator pressure itself, the pump pressure itself, or a combination of both.

Two embodiments of our invention are illustrated in the accompanying drawings, in which.

Figure 1:
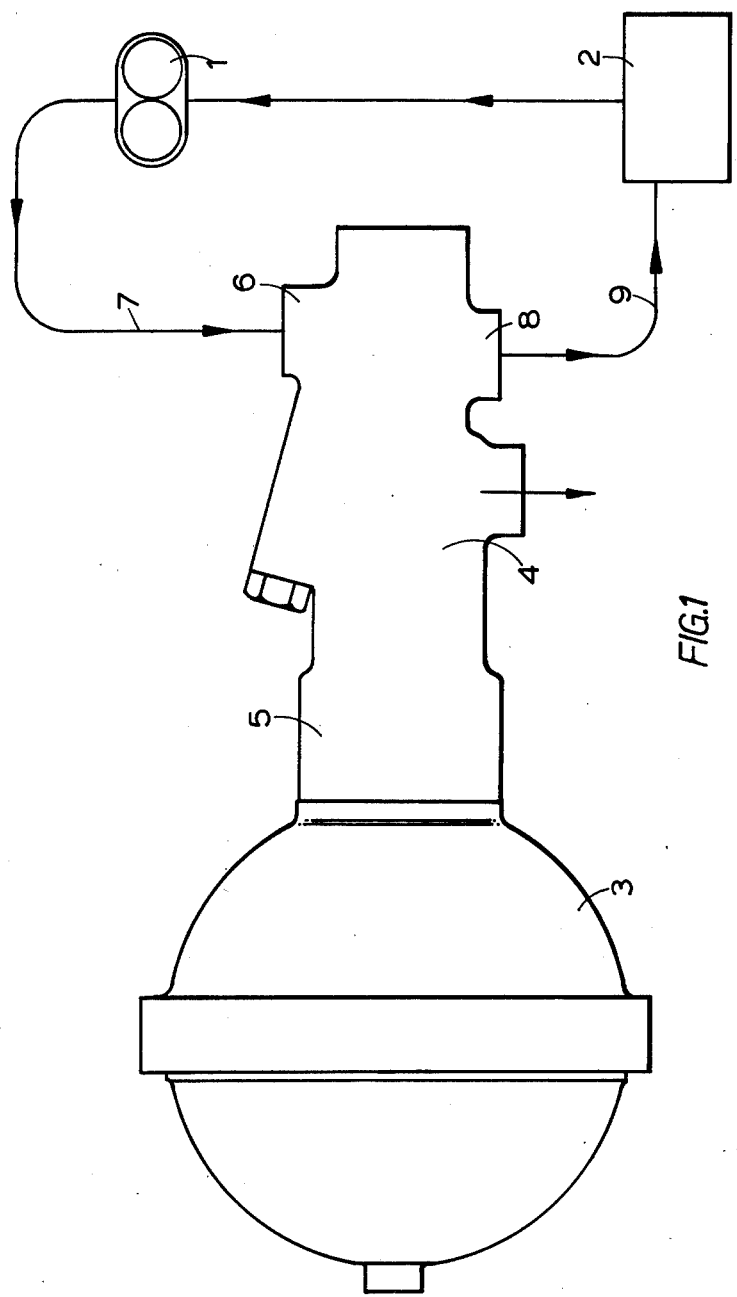
FIG. 1 is a layout of an hydraulic system.

The hydraulic system illustrated in FIG. 1 of the drawings comprises an hydraulic pump 1 which draws hydraulic fluid from a tank 2 to charge an hydraulic accumulator 3 with fluid under pressure. An unloader valve 4 is located between the pump 1 and the accumulator 3. The unloader valve 4 is located in a housing 5 to which the accumulator 3 is connected at one end and which has an inlet port 6 to which an outlet port (not shown) of the pump 1 is connected along pipe-line 7 and an exhaust port 8 connected to the tank 2 along pipe-line 9.

Figure 2:
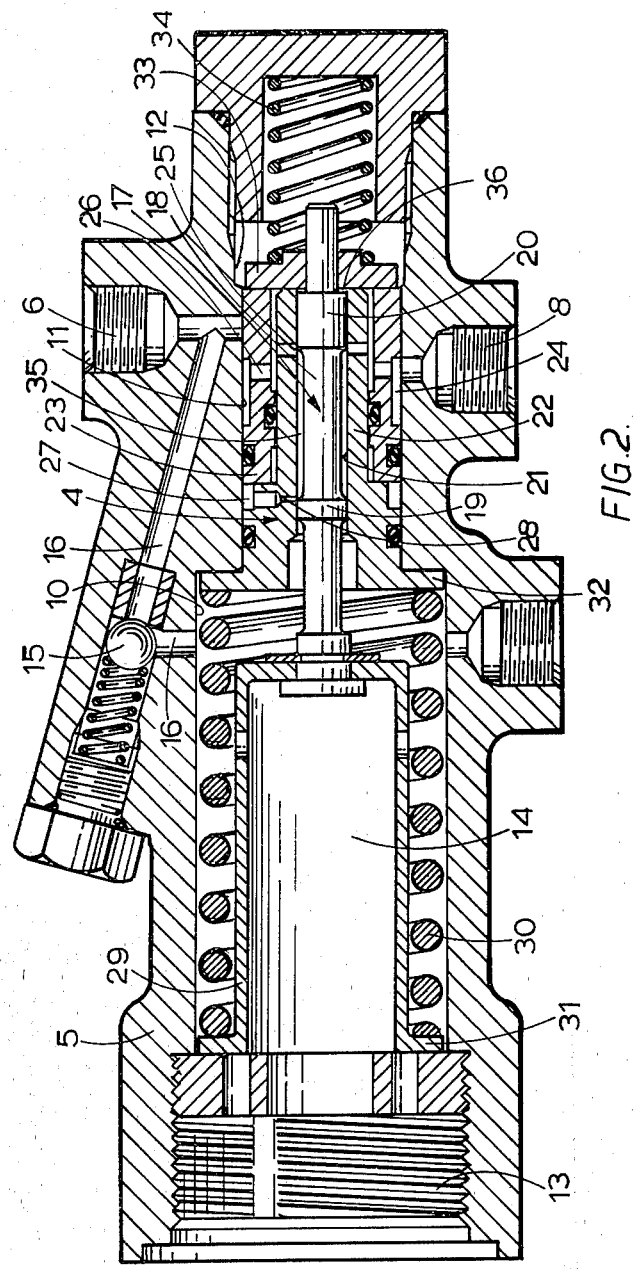
FIG. 2 is a longitudinal section through an unloader valve for use in the system of FIG. 1.

The unloader valve 4, as shown in FIG. 2, is located in a stepped bore in the housing having bore portions 10 and 11 of greater and smaller diameters, and a portion 12 of a diameter slightly greater than the portion 11. The inlet and exhaust ports 6 and 8 are located in the small bore portion 11 and a port 13 at the end of the largest bore portion 10 is connected to the accumulator 3. The port 6 is connected to a chamber 14 defined in the bore portion 10 through a one-way valve 15 located in a passage-way 16 in the wall of the housing 5.

The unloader valve 4 includes a control valve 17 to control communication between the various ports. The control valve 17 comprises a spool 18 provided with spaced lands 19 and 20 which work in a longitudinal bore 21 in a sleeve member 22 which works in the small bore portion 11. A slave piston 23 also working in the bore portion 11 is slidably mounted on the sleeve member 22. The piston 23 has a reduced diameter portion defining an annular exhaust chamber 24 in communication with the exhaust port 8 and which is connected to the bore 21 through radial ports 25, 26 in the slave piston 23 and sleeve member 22, respectively. An annular pressure chamber 27 is defined between one end of the slave piston 23 and a shoulder on the sleeve member 22 and is connected to the bore 21 through a restricted orifice 28.

One end of the spool 18 extends into the chamber 14 and is rigidly connected to a top-hat member 29 working in the bore portion 10 and urged to the left by a first spring 30 acting between flanges 31, 32 on the top-hat member 29 and the sleeve member 22, respectively. The other end of the spool 18 extends through an annular plate 33 into the bore portion 12. The plate 33 engages the adjacent ends of the sleeve member 22 and the slave piston 23, and a second spring 34 acts between the end of the housing 5 and the plate 33.

When the pump 1 is operated initially, the unloader valve is in the position shown in FIG. 2. Fluid is drawn from the tank 3 and is pumped into the accumulator 3 through the one-way valve 15 and the chamber 14. In this situation the pressure chamber 27 is connected to the tank 2 through the orifice 28, a chamber 35 defined between the spool lands 19 and 20, and the radial ports 25, 26. This continues until the pressure in the chamber 14 from the accumulator 3 acting on the spool 18 attains a predetermined cut-out value, say 1500 p.s.i. This pressure is sufficient to overcome the load in the first spring 30 and move the spool 18 to the right to take up a clearance 36 between the land 20 and the plate 33. The pressure on the spool 18 then acts on the second spring 34. When the pressure increases to 2000 p.s.i., it can also overcome the load on the spring 34 so that the spool 18 can be moved further to the right against the loading in both springs 30 and 34. During this movement the land 19 first closes the orifice 28 to isolate the pressure chamber 27 from the tank, and subsequently passes completely over the orifice 28 to allow accumulator pressure from the chamber 14 to enter the pressure chamber 27 and pressurise the chamber after a time delay due to the restricted orifice 28. This ensures smooth operation. Accumulator pressure then acting on the slave piston 23 easily urges it to the right away from the accumulator, overcoming the load in the second spring 34 and connecting the exhaust chamber 24 to the inlet port 6. The pump 1 is then unloaded directly through the annular exhaust chamber 24, and a small proportion of the pump output can also pass to the port 8 through the radial ports 25, 26 and the chamber 35. At this stage only the first spring 30 is acting on the spool 18 since the loading of the second spring 34 has been taken by the slave piston 23.

When the accumulator pressure drops to a cut-in pressure, say 1500 p.s.i., at which the force due to the accumulator pressure acting on the spool 18 to urge it away from the accumulator is less than the force of the spring 30 acting in the opposite direction, the spool 18 will move back to its original position with the pressure chamber 27 being re-connected to tank through the restricted orifice 28. The second spring 34, acting as the slave piston return spring, then urges the slave piston 23 back to its original portion after a time delay due to the restricted orifice 28, thus disconnecting the pump inlet 6 from the tank and allowing the pump 1 to re-charge the accumulator 3.

Thus the cut-out pressure is determined by the pre-load in both springs and the cut-in pressure is determined by the pre-load in the first spring 30 only, which is greater than that of the second spring 34. Suitable values are 75 lbs for the first spring and 25 lbs for the second spring. If the area of the spool 18 over which the accumulator pressure acts is 0.05 in., then:

$$\text{Cut-out pressure} = \frac{75 + 25}{0.05}$$
$$= 2000 \text{ p.s.i; and}$$
$$\text{Cut-in pressure} = \frac{75}{0.05}$$
$$= 1500 \text{ p.s.i.}$$

The cut-in and cut-out points can be selected and altered as desired by producing springs 30, 34 of different preloads. In an alternative embodiment, the slave piston 23 may be used actively to disable the pump 1, rather than connecting it to tank.

Figure 3:
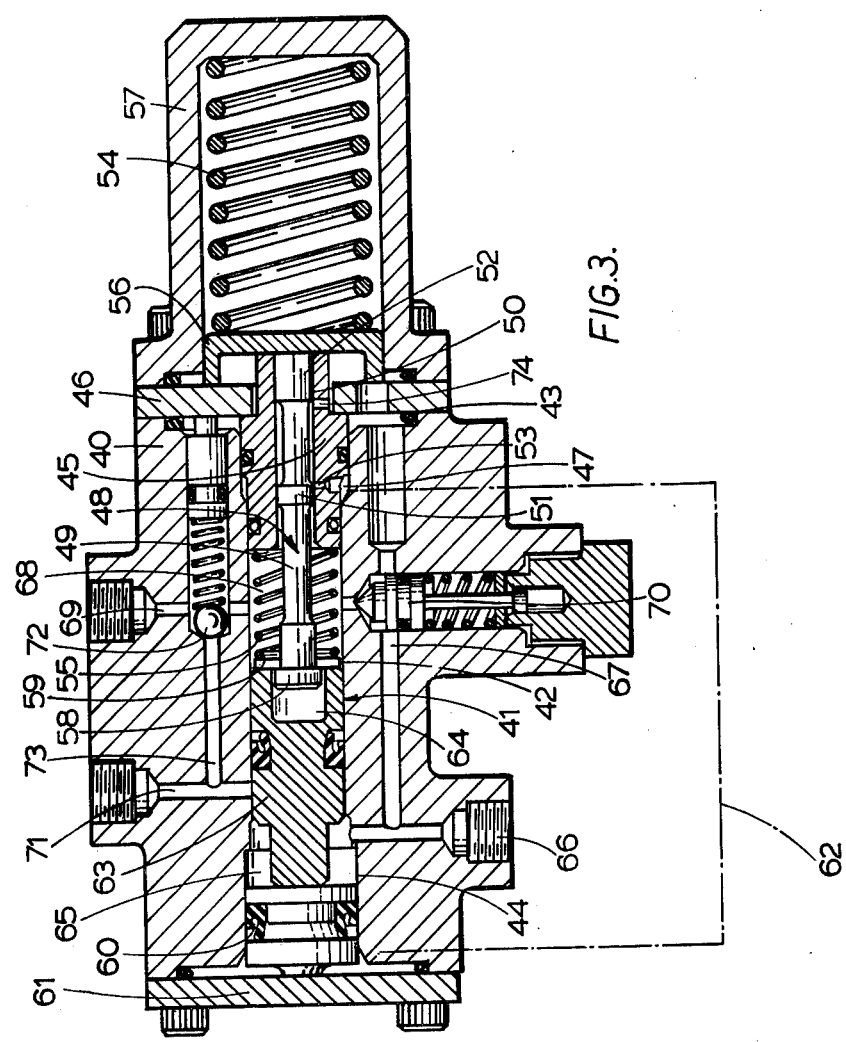
FIG. 3 is a longitudinal section similar to FIG. 2, but through a modified unloader valve.

The unloader valve illustrated in FIG. 3 of the accompanying drawings comprises a housing 40 provided with a through bore 41. The bore 41 comprises a central portion 42 of constant diameter and opposed end portions 43 and 44 of increased diameter.

A stepped closure plug 45 which is retained in the bore 43 by a stop plate 46 projects into the bore portion 42 and an annular pressure chamber 47 is defined between the complementary spaced shoulders at the changes in diameter between the bore 41 and the plug 45.

A control valve 48 comprising a spool 49 which is guided for sliding movement in a bore 50 in the plug 45 includes spaced lands 51 and 52 which, in the position shown, are located on opposite sides of a restricted orifice 53 which leads from the bore 50 into the pressure chamber 47. The spool 49 is biassed into this position by means of first spring 54 and a second spring 55. The first spring 54 acts between a cup-shaped abutment member 56 engaging with the end of the spool 49 which projects from the outer end of the plug 45, and a spring retainer comprising a sealed closure cap 57. The cap 57 also encloses the abutment member 56 and acts to clamp the stop plate 46 against the adjacent end of the housing 40. The second spring 55, which is weaker than the first spring 54, acts between the inner end of the plug 45 and an enlarged head 58 at the inner end of the spool 49 through an abutment collar 59 which is slidably mounted on the spool 49.

A slave comprising a piston 60 works in the bore portion 44 and the outer end of the piston 60, which is adjacent to a sealed closure plate 61, is in communication with the pressure chamber 47 through a connection 62.

An intermediate piston 63 works in the bore portion 42 and is disposed between the piston 60 and the abutment collar 59. The piston 63 is provided in the end adjacent to the plug 45 with a recess 64 into which the head 58 projects and which is of an axial length substantially greater than that of the head 58.

A by-pass space 65 in the bore 41 between the piston 60 and the piston 63 is connected to the tank for fluid through an exhaust port 66. The exhaust port 66 also communicates through a longitudinal passage 67 with the interior of the cap 57 so that the adjacent outer end of the spool 49 is at atmospheric pressure.

A pressure chamber 68 defined in the bore 41 between the piston 63 and the plug 45 is connected to an accumulator through a radial outlet passage 69 and to the longitudinal passage 67 through a normally closed spring-loaded pressure relief valve 70.

A pump is connected to an inlet passage 71 which is normally closed by the piston 63 when the piston 63 is in the inoperative position shown, and the passage 71 leads into the outlet passage 69 through a spring-loaded one-way valve 72 located in a connecting passage 73.

When the pump is operated initially the unloader valve is in the first position shown in the drawings with the pressure chamber 47 isolated from the pressure chamber 68 by the spool 49, and placed in communication with the tank through a port 74 between the lands 51 and 52. Fluid is drawn from the tank and is pumped into the accumulator through the passage 73, the one-way valve 72 and the outlet passage 69 from whence it also enters the pressure chamber 68. The pressure in the pressure chamber 68 acts on the piston 63 to hold the piston 60 against a stop defined by the plate 61 and acts on the spool 49 against the loading in both springs 54 and 55. The pressure in the chamber 68 rises until a cut-out pressure of say 2000 p.s.i. is attained which is sufficient to overcome the loading in both springs 54 and 55. The spool 49 then moves towards the cap 57 into a second position initially causing the land 51 to close the orifice 53 to isolate the tank from the pressure chamber 47 and thereafter to place the pressure chamber 47 in communication with the pressure chamber 68. The slave piston 60 is then exposed through the external connection 62 to the pressure within the accumulator and, due to the difference in areas between the piston 60 and the piston 63, both pistons move towards the plug 45 against the force in the spring 55 and with respect to the spool 49. This relieves the spool 49 of the loading of the spring 55 so that the spool 49 moves further towards the cap 57 against the spring 54. The piston 63 uncovers the inner end of the passage 71 so that pressure from the pump is returned directly to the tank through the by-pass space 65.

When the accumulator pressure drops to a cut-in pressure, say 1500 p.s.i., at which the force acting on the spool 49 is insufficient to hold the spool 49 in the second position against the spring 54, the spool 49 is returned to its initial first position with the land 51 passing over the orifice 53. This reduces the pressure acting on the slave piston 60, which is returned to tank through the port 74, the passage 67 and the port 66. The second spring 55 and the pressure in the accumulator which acts on the piston 63 then acts to return the pistons 60 and 63 to their initial positions with the piston 63 closing the passage 71 so that the fluid is again pumped to the accumulator.

As in the embodiment of FIGS. 1 and 2 the cut-out pressure is determined by the pre-load in both springs 54 and 55, and the cut-in pressure is determined by the pre-load in the first spring 54. Also the orifice 53 provides a slight delay which ensures a smooth operation of the valve.

I claim:

1. An hydraulic system for a vehicle comprising an hydraulic pump, an hydraulic accumulator, a tank for fluid from which said pump draws fluid for charging said accumulator, and an unloader valve between said pump and said accumulator for preventing said accumulator from being overcharged and for allowing said pump to re-charge said accumulator should pressure of fluid stored therein fall below a minimum value, wherein said unloader valve incorporates a housing, a control valve, and a pressure responsive slave in said housing, said valve being operated by fluid pressure under the control of said control valve, said control valve comprising a valve member which is movable between a first position in which said accumulator is isolated from said slave so that pressure from said pump is supplied to said accumulator, and a second position in which pressure from said accumulator can act on said slave to render said slave operative to reduce said pressure from said pump to that of said tank, and spring means for biassing said valve member towards said first position, said valve member being subjected to a control pressure dependent upon the pressure in said accumulator and in response to which said valve member can move at a cut-out point from said first position into said second position against the bias in said spring means, said bias in said spring means determining a cut-in point at which pressure in said accumulator is less than said pressure in said accumulator at a cut-out point at which said valve member can move from said second position into said first position.

2. An hydraulic system as claimed in claim 1, wherein first and second springs bias said valve member towards said first position and said first spring is operative at all times, said second spring being inoperative at least when said valve member is in the second position, and the bias in said first spring alone determines said cut-in point.

3. An hydraulic system as claimed in claim 1, wherein said control valve and said slave are arranged co-axially and work in a single bore, and said second spring comprises a return spring for said slave.

4. An hydraulic system as claimed in claim 1, wherein a restriction is located in a connection between said control valve and said slave.

5. An hydraulic system as claimed in claim 1, wherein said slave comprises a slave member for connecting said pump to said tank when said cut-out pressure is attained.

6. An hydraulic system as claimed in claim 2, wherein said valve member comprises a valve spool which works in a bore in said housing and is acted on at one end by said first spring, and said valve spool includes axially spaced lands which control communication between said pump, said slave and said accumulator, and a one-way valve is located in said housing between said pump and said accumulator to permit flow from said pump into said accumulator.

7. An hydraulic system as claimed in claim 6, wherein said slave comprises a sleeve slidably mounted on said spool and working in said bore when said second spring acting on one end of said slave is inoperative.

8. An hydraulic system as claimed in claim 6, wherein said sleeve comprises a piston which works in said bore and acts on said spool through an intermediate member which is biassed into engagement with said slave by said second spring at least when said fluid pressure from said accumulator acts on said slave.

* * * * *